2,694,720

N-ACYLATED PHENOLSULFONAMIDES

John Joseph Denton and Nicanor Quinones Quinones, Bound Brook, N. J., assignors to American Cyanamid Company, New York, N. Y., a corporation of Maine No Drawing. Application July 27, 1949,
Serial No. 107,134

12 Claims. (Cl. 260—347.2)

This invention relates to novel organic compounds and more particularly to N-acyl-4-hydroxybenzenesulfonamides and methods for their preparation.

We have discovered a new class of sulfonamido phenols which appears to have therapeutic effect in certain neurotropic diseases. The exact manner of effect is at present unknown. However, we have observed that these compounds possess definite in vivo activity against certain neurotropic viruses such as equine encephalitis and S. K. neutotropic virus strains.

The compounds of our invention are new and have not previously been described, and are characterized by the formula

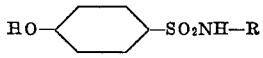

$$HO-\langle\rangle-SO_2NH-R$$

where R is an acyl radical which can be chosen from among various substituted or unsubstituted aliphatic, aromatic and heterocyclic acyl groups such as acetyl, chloracetyl, benzoyl, nitrobenzoyl, furoyl, butyryl, crotonoyl, caproyl, naphthoyl, phenylacetyl, nicotinoyl, methyl benzoyl, chlorbenzoyl, and the like.

These compounds may be prepared in several different ways. The one which is presently preferred is by the acylation of the amide nitrogen of 4-acyloxybenzenesulfonamides followed by the selective hydrolysis of the 4-acyloxy group to give the 4-hydroxy-N-acyl sulfonamide. One variant which possesses advantage in certain cases is to acylate both at the N and at the hydroxyl in the 4-position of p-hydroxybenzenesulfonamide followed by the selective hydrolysis of the 4-acyloxy group.

The above methods are preferred but modifications can be used depending on the starting materials and the type of acyl groups desired. Among these modifications is the reaction of alkali metal salts of 4-acyloxybenzenesulfonamides under anhydrous conditions with acyl halides or acid anhydrides.

Another method is by the diazotization of the N'-acyl sulfanilamide followed by decomposition of the resulting diazonium salt to a hydroxy group.

The preferred method, the first one cited above, is the least expensive of the available methods when complex compounds are to be prepared and where the cost of the acyl halide or acid anhydride used for the N-acylation is an important factor. In this method a 4-acyloxybenzenesulfonamide is acylated on the amide nitrogen and then the acyloxy group in the 4-position is cleaved hydrolytically under selective conditions so that the N-acyl group is not disturbed, thus giving the desired N-acyl-4-hydroxybenzenesulfonamide. The acyl moiety of the 4-acyloxy group can be any convenient acyl radical such as carbethoxy, p-toluenesulfonyloxy, benzoxy, acetoxy and others, and is chosen primarily for its ease in removal in the subsequent hydrolysis.

The N-acylation is preferably carried out in a medium containing a tertiary nitrogen base such as pyridine, quinoline and the like which serves as an acceptor for the acid liberated during the reaction. No additional solvent is necessary. The acylation agents are preferably the acyl chlorides or anhydrides. The reaction is straightforward and proceeds at economic rates in the temperature range between 50–150° C. The temperature at which the reaction is run depends upon the reactivity of the particular acylating agent used. The above cited range is within the stability range of all of the acylation reagents commonly contemplated. The time for the reaction to proceed to reasonable completion is dependent on the temperature, on the concentration of reactants and the reactivity of the acetylating compound. Close check of the reaction can be kept by means of simple laboratory tests. In general, as will be noted in the examples, most of the reactions run to reasonable completion within 7 hours. The diacyl compound resulting from the reaction need not be isolated or purified but may be used directly in the subsequent selective hydrolysis.

The selective hydrolytic cleavage of the acyloxy group in the 4-position of the benzene nucleus takes place preferably in an aqueous solvent. Though acidic conditions may be used, mildly alkaline hydrolytic conditions are preferred. Alkali metal carbonates and hydroxides are satisfactory for use in this hydrolysis, which can be effected over a wide range of conditions. The temperature may range from about 0–150° C. with the preferred temperature being between 50–100° C., but this may vary with the nature of the compound being hydrolyzed. Sodium hydroxide in molar excess and at concentrations ranging above 5% is the preferred medium. When acidic conditions are used for the hydrolysis, the conversion of the acyloxy group to the hydroxy group can be effected by using hydrochloric acid, sulfuric acid, and other known acid hydrolyzing agents.

Although this hydrolysis is usually conducted under essentially aqueous conditions, the water may be replaced in part with inert organic solvents. The presence of an inert water immiscible organic solvent in the reaction mixture is not precluded and in fact, offers certain advantages in some cases. The examples show the hydrolysis of representative compounds and are intended to disclose the general preferred method. Variations and further details are within the skill of those practicing the art.

Another preferred method, essentially similar to the previously described method, is used where the acylating halide or other acylating agent is of a cheap and readily available type. In this method, p-hydroxybenzenesulfonamide is used as the starting material and it is treated with the acylating agent to form the diacyl derivative, N-acyl-4-acyloxybenzenesulfonamide. The acyloxy group in the 4-position of the benzene ring is then selectively cleaved hydrolytically to give a hydroxyl group but to leave undisturbed the N-acyl group. This selective hydrolysis is essentially the hydrolysis in the aforementioned process and the general limitations as to time, temperature, solvents and other conditions of the aforementioned hydrolysis govern equally in this process.

Insofar as the variations on the above outlined methods are concerned, they are all straightforward and details of each particular reaction may be worked out by persons skilled in the art without undue experimentation.

The invention will now be illustrated by specific examples to show the preparation of representative N-acyl-4-hydroxybenzenesulfonamides. It is understood that the examples are merely illustrative and are by no means intended to limit the scope of this application. Unless otherwise indicated, all parts are by weight.

Example 1

To 88 parts of acetic anhydride is added 61 parts of 1-phenol-4-sulfonamide. The mixture is heated with stirring at 120–130° C. for seven hours. On cooling and dilution with water, a solid separates. It is collected on a filter and washed with water. While still wet, it is dissolved in dilute caustic solution and warmed on the steam bath for 15–30 minutes. Cooling and acidification of this solution causes N-(4-hydroxyphenylsulfonyl) acetamide to precipitate. It may be further purified by recrystallization from acetic acid and then melts at 195.5–197.5° C. with decomposition.

Example 2

To a solution of 17.3 parts of 1-phenol-4-sulfonamide in 100 parts by volume of pyridine is added dropwise 31 parts of benzoyl chloride while the temperature is kept at 50–70° C. The resulting reaction mixture is heated for one hour at 90° C., made alkaline to Brilliant Yellow test paper with 25% aqueous caustic and stirred for an additional hour at 90° C. The pyridine is removed by distillation, 100 parts of water is added, and the solution is acidified with hydrochloric acid. The solid which separates is collected on a filter, dried and recrystallized from acetic acid. Pure N-(4-hydroxyphenylsulfonyl) benzamide melts at 202–203° C. with decomposition.

*Example 3*

By following the procedure in Example 2, using 26 parts instead of 17.3 parts of 1-phenol-4-sulfonamide and using 45 parts of furoyl chloride instead of 31 parts of benzoyl chloride, N-(4-hydroxyphenylsulfonyl) furamide, melting with decomposition at 198–203° C. in obtained.

*Example 4*

To 27.7 parts 4-benzoxybenzenesulfonamide (prepared in larger amount by adding 802 parts of 4-benzoxybenzenesulfonyl chloride to 350 parts by volume of 29% aqueous ammonia and stirring the slurry for 3 hours at 35° C. before collecting on a filter, washing thoroughly with water and drying; melting point 248.5–251.5° C.) in 150 parts by volume of pyridine is added 15.5 parts of benzoyl chloride, and the reaction mixture is heated at 90° C. for 3 hours. It is then treated with 50 parts by volume of 50% aqueous caustic, the pyridine is removed by distillation, water is added if necessary to dissolve any solids, and the aqueous solution is acidified. The desired benzamide which separates, may be collected and purified either as in Example 2 or by recrystallization from aqueous alcohol to give N-(4-hydroxyphenylsulfonyl) benzamide melting with decomposition at 202–203° C.

*Example 5*

To a solution of 70 parts of 4-benzoxybenzenesulfonamide in 200 parts by volume of pyridine kept at 75° C. is added dropwise a solution of 42 parts of phenylacetyl chloride in 100 parts by volume of benzene. The reaction mixture is refluxed for 4 hours and is made basic to phenolphthalein by the addition of dilute caustic. The organic solvents are removed by distillation; water is added as necessary during the distillation to keep solids from separating. The remaining aqueous solution is then acidified to precipitate the desired N-(4-hydroxyphenylsulfonyl) phenylacetamide. When purified by recrystallization from acetic acid, it melts at 198–199° C.

*Example 6*

A solution of 16 parts benzoyl chloride in 150 parts by volume of diethyl ether is stirred at room temperature and treated with 30 parts of the sodium salt of 4-benzoxybenzenesulfonamide. The reaction mixture is allowed to stand 15 hours. The solid material is collected on a filter and dissolved in 50 parts by volume of 5 N caustic; the latter solution is warmed for 15–30 minutes on a steam bath, cooled, and acidified. The solid N-(4-hydroxyphenylsulfonyl) benzamide which precipitates is the same after purification as that described in Example 2.

The sodium salt of 4-benzoxybenzenesulfonamide may be prepared as follows: 55.4 parts of 4-benzoxybenzenesulfonamide is dissolved in 200 parts by volume of pyridine. To this is added 12 parts of sodium methylate, and the resulting mixture is heated and stirred for 1½ hours at 110° C. After cooling, addition of 100 parts by volume of ether to the reaction mixture causes the sodium salt of 4-benzoxybenzenesulfonamide to precipitate. It is collected on a filter and dried.

*Example 7*

By using the procedure of Example 6 and substituting 15 parts of furoyl chloride for the 16 parts of benzoyl chloride, the N-(4-hydroxyphenylsulfonyl) furamide is obtained. It is identical with that described in Example 3.

*Example 8*

To a stirred solution of 42 parts of phenylacetyl chloride in 100 parts by volume of diethyl ether and 100 parts by volume of benzene at room temperature is added 75 parts of the sodium salt of 4-benzoxybenzenesulfonamide. The reaction mixture is allowed to stand for 15 hours. Crystallization is aided by the addition of a small amount of 50% aqueous caustic; the solid formed is collected on a filter, dissolved in 200 parts warm water, and the alkaline solution is acidified after about ½ hour to precipitate the product. The resulting N-(4-hydroxyphenylsulfonyl) phenylacetamide when pure, is identical with that prepared by the procedure of Example 5.

*Example 9*

By following the procedure of Example 6 and substituting 18 parts of p-chlorobenzoyl chloride for the 16 parts of benzoyl chloride, N-(4-hydroxyphenylsulfonyl)-4-chlorobenzamide results.

We claim:

1. Compounds having the general formula:

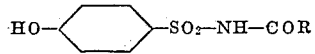

in which R is a member selected from the group consisting of lower alkyl, phenyl, 4-chlorophenyl, benzyl and 2-furyl radicals.

2. Compounds having the general formula

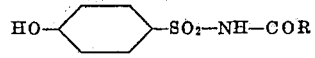

in which R is a lower alkyl radical.

3. N-(4-hydroxyphenylsulfonyl) acetamide.
4. N-(4-hydroxyphenylsulfonyl) furamide.
5. N-(4-hydroxyphenylsulfonyl) chlorobenzamide.
6. A process of preparing compounds of the group consisting of those having the formula

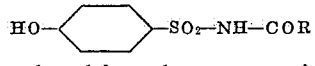

in which R is selected from the group consisting of lower alkyl, phenyl, 4-chlorophenyl, benzyl and 2-furyl radicals which comprises the step of heating, in an aqueous medium at a hydrogen ion concentration of other than pH 7, a compound of the group having the formula

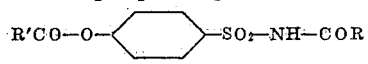

wherein R and R' are radicals of the group consisting of lower alkyl, phenyl, 4-chlorophenyl, benzyl and 2-furyl radicals.

7. A process of preparing compounds of the group consisting of those having the formula

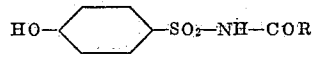

in which R is selected from the group consisting of lower alkyl, phenyl, 4-chlorophenyl, benzyl and 2-furyl radicals which comprises the step of heating, in an aqueous medium at a hydrogen ion concentration at which the numerical value of the sum of the hydrogen ion concentration and the hydroxyl ion concentration is greater than $2 \times 10^{-7}$, a compound having the formula

wherein R and R' are radicals of the group consisting of lower alkyl, phenyl, 4-chlorophenyl, benzyl and 2-furyl radicals.

8. A process of preparing compounds of the group consisting of those having the formula

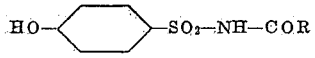

in which R is selected from the group consisting of lower alkyl, phenyl, 4-chlorophenyl, benzyl and 2-furyl radicals which comprises the step of heating, in an aqueous medium under conditions such that the hydrogen ion concentration has a value different than the hydroxyl ion concentration, a compound of the group having the formula

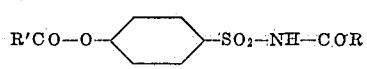

wherein R and R' are radicals of the group consisting of lower alkyl, phenyl, 4-chlorophenyl, benzyl and 2-furyl radicals.

9. A process of preparing compounds of the group consisting of those having the formula

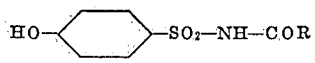

in which R is selected from the group consisting of lower alkyl, phenyl, 4-chlorophenyl, benzyl and 2-furyl radicals which comprises the step of heating, in an aqueous medium under hydrogen ion concentration conditions of the group consisting of acidic conditions and alkaline conditions, a compound of the group having the formula

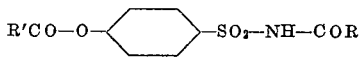

wherein R and R' are radicals of the group consisting of lower alkyl, phenyl, 4-chlorophenyl, benzyl and 2-furyl radicals.

10. A process of preparing compounds of the group consisting of those having the formula

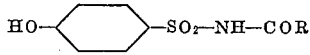

in which R is selected from the group consisting of lower alkyl, phenyl, 4-chlorophenyl, benzyl and 2-furyl radicals which comprises the step of heating, in an aqueous medium under acidic conditions, a compound of the group having the formula

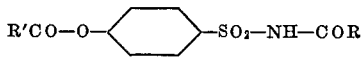

wherein R and R' are radicals of the group consisting of lower alkyl, phenyl, 4-chlorophenyl, benzyl and 2-furyl radicals.

11. A process of preparing compounds of the group consisting of those having the formula

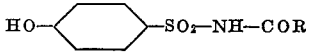

in which R is selected from the group consisting of lower alkyl, phenyl, 4-chlorophenyl, benzyl and 2-furyl radicals which comprises the step of heating, in an aqueous medium under alkaline conditions, a compound of the group having the formula

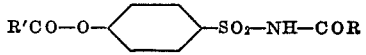

wherein R and R' are radicals of the group consisting of lower alkyl, phenyl, 4-chlorophenyl, benzyl and 2-furyl radicals.

12. A process of preparing compounds of the group consisting of those having the formula

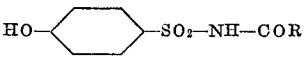

in which R is selected from the group consisting of lower alkyl, phenyl, 4-chlorophenyl, benzyl and 2-furyl radicals which comprises the step of heating at a temperature between 50° C. and 150° C. in an aqueous medium under alkaline conditions a compound of the group having the formula

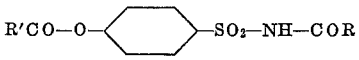

wherein R and R' are radicals of the group consisting of lower alkyl, phenyl, 4-chlorophenyl, benzyl and 2-furyl radicals.

References Cited in the file of this patent

UNITED STATES PATENTS

| Number | Name | Date |
|---|---|---|
| 2,236,168 | Dietrich | Mar. 25, 1941 |
| 2,411,661 | Martin et al. | Nov. 26, 1946 |
| 2,498,782 | Arquet et al. | Feb. 28, 1950 |

FOREIGN PATENTS

| Number | Country | Date |
|---|---|---|
| 60,153 | Denmark | Sept. 21, 1942 |
| 162,888 | Austria | Apr. 25, 1949 |
| 602,558 | Great Britain | May 28, 1948 |
| 854,325 | France | Jan. 15, 1940 |

OTHER REFERENCES

Steinkopf: "J. Prakt, Chem.," vol. 117, Series 2 (1925), p. 58.

Williams: Biochemical J., vol. 35 (1941), pp. 557–563 and 1169–73.

Kermack: J. Chem. Soc., London, 1939, pp. 608–10.

Northey: The Sulfonamides (1948), Reinhold Pub. Co., N. Y., pp. 99–103.